United States Patent
van Nieuwstadt et al.

(10) Patent No.: US 6,968,680 B2
(45) Date of Patent: Nov. 29, 2005

(54) DIESEL ENGINE SYSTEM FOR USE WITH EMISSION CONTROL DEVICE

(75) Inventors: Michiel J. van Nieuwstadt, Ann Arbor, MI (US); Devesh Upadhyay, Dearborn, MI (US); William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/722,855

(22) Filed: Nov. 25, 2003

(65) Prior Publication Data

US 2004/0103653 A1 Jun. 3, 2004

Related U.S. Application Data

(63) Continuation of application No. 10/064,626, filed on Jul. 31, 2002, now Pat. No. 6,679,051.

(51) Int. Cl.⁷ ................................................. F01N 3/00
(52) U.S. Cl. .......................... 60/288; 60/274; 60/286; 60/295; 60/297; 60/324
(58) Field of Search .......................... 60/274, 275, 285, 60/286, 287, 288, 295, 297, 303, 324; 137/875; 251/142, 149

(56) References Cited

U.S. PATENT DOCUMENTS

| | | |
|---|---|---|
| 3,974,861 A | 8/1976 | Goto et al. |
| 4,175,386 A | 11/1979 | Katahira et al. |
| 4,474,008 A | 10/1984 | Sakurai et al. |
| 4,936,093 A | 6/1990 | Goerlich |
| 4,945,722 A | 8/1990 | Goerlich |
| 5,365,733 A | 11/1994 | Takeshima et al. |
| 5,365,734 A | 11/1994 | Takeshima |
| 5,910,097 A | 6/1999 | Boegner et al. |
| 5,974,791 A | 11/1999 | Hirota et al. |
| 6,082,100 A | 7/2000 | Boegner et al. |
| 6,105,365 A | 8/2000 | Deeba et al. |
| 6,170,259 B1 | 1/2001 | Boegner et al. |
| 6,233,926 B1 | 5/2001 | Bailey et al. |
| 6,253,548 B1 | 7/2001 | Ap et al. |
| 6,266,956 B1 | 7/2001 | Suzuki et al. |
| 6,314,722 B1 | 11/2001 | Matros et al. |
| 6,502,391 B1 * | 1/2003 | Hirota et al. .................. 60/288 |
| 6,560,958 B1 * | 5/2003 | Bromberg et al. ............ 60/275 |
| 6,679,051 B1 * | 1/2004 | van Nieustadt et al. ...... 60/286 |
| 6,679,052 B2 * | 1/2004 | Nakatani et al. .............. 60/297 |
| 6,708,486 B2 * | 3/2004 | Hirota et al. .................. 60/297 |
| 2001/0032458 A1 | 10/2001 | Suzuki et al. |
| 2003/0066287 A1 | 4/2003 | Hirota et al. |
| 2003/0074893 A1 * | 4/2003 | Webb et al. ................... 60/285 |
| 2003/0140622 A1 * | 7/2003 | Taylor et al. ................. 60/295 |
| 2003/0168116 A1 * | 9/2003 | Brenner et al. ............. 137/875 |

FOREIGN PATENT DOCUMENTS

JP     2002364337     12/2002

OTHER PUBLICATIONS

SAE #2001–01–3619; "High–Efficiency NOx and PM Exhaust Emission Control for Heavy–Duty On–Highway Diesel Engines—Part Two", Schenk et al., U.S. EPA–Office of Transportation and Air Quality; International Fall Fuels and Lubricants Meeting and Exposition, San Antonio, TX, Sep. 24–27, 2001.

"Fleets wary of new diesels", *The Detroit News*, May 31, 2002, p. 3B.

* cited by examiner

*Primary Examiner*—Tu M. Nguyen
(74) *Attorney, Agent, or Firm*—Allan J. Lippa; Alleman Hall McCoy Russell & Tuttle LLP

(57) ABSTRACT

An exhaust valve downstream of a diesel engine splits exhaust gasses between two catalysts. In one position, most of the exhaust gasses go to a first catalyst, and the remaining exhaust gasses, along with injected reductant go to a second catalyst. In a second position, most of the exhaust gasses go to the second catalyst, and the remaining exhaust gasses, along with injected reductant go to the first catalyst. In this way, a reduced cost system is achieved.

22 Claims, 8 Drawing Sheets

US 6,968,680 B2

DIESEL ENGINE SYSTEM FOR USE WITH EMISSION CONTROL DEVICE

CROSS-REFERENCE TO RELATED APPLICATIONS

This application is a continuation application of and claims priority to U.S. patent application Ser. No. 10/064,626, filed Jul. 31, 2002, now U.S. Pat. No. 6,679,051, and is hereby incorporated in its entirety for all purposes.

FIELD OF THE INVENTION

Field of the present invention relates generally to $NO_x$ reduction of diesel engines having an emission control device that stores $NO_x$ during certain conditions and releases/reduces stored $NO_x$ during other operating conditions. More particularly, the field of the present invention relates to system configurations to reduce component part costs.

BACKGROUND OF THE INVENTION

Lean burn engines, such as diesel and gasoline engines, can provide increased fuel economy and power density. One approach to reduce $NO_x$ emissions uses a catalytic converter in the engine exhaust. One type of catalytic converter stores $NO_x$ when the engine is running lean, and releases/reduces the stored $NO_x$ when a rich exhaust gas enters the catalytic converter. When using a diesel engine, one approach to provide rich exhaust gases to the catalytic converter uses a fuel injector positioned in the engine exhaust.

However, to minimize the amount of excess fuel added to create the rich exhaust gas (due to the large amount of excess oxygen when running lean), a split exhaust gas pipe, each containing a fuel injector and a catalytic converter is utilized. Further, a valve assembly is also used that directs the flow to either branch, and allows reduction of the flow to the branch that is receiving the rich exhaust gas. This requires the downstream injector to overcome only a smaller amount of excess oxygen. Such a system is described in SAE Paper No. 2001-01-3619.

The present inventors, however, have recognized a disadvantage with such an approach. In particular, such a configuration contains two exhaust valves (one for each branch) and two fuel injectors in the exhaust pipes (again, one for each branch). This additional hardware significantly increases system costs, as well as manufacturing complexity and wiring complexity.

The trucking industry is extremely cognizant of increased capital and operating costs of emissions related technology. As described in a recent newspaper article (see "Fleets Wary of New Diesels", May 31, 2002, *The Detroit News*, pg. 3B), additional cost of new technology is a major impediment to its implementation.

SUMMARY OF THE INVENTION

The above disadvantages are overcome by a system comprising: an engine having an exhaust system through which exhaust gasses flow; a first and second emission control device in said exhaust system of said engine; an injector in said exhaust system that injects a reductant; and an exhaust valve in said exhaust system upstream of said first and second emission control device, said valve having at least a first and second position, said first position creating a first path for said reductant from said injector to reach said first emission control device, and a second position creating a second path for said reductant from said injector to reach said second emission control device.

In this way, it is possible to minimize reductant needed to purge a $NO_x$ catalyst without the added cost and complexity of requiring multiple injectors. I.e., by this judicious plumbing, the present invention can achieve the same ability of directing lean exhaust flow of a large magnitude, and rich exhaust flow of a small magnitude with reduced system costs and complexity. In other words, the configuration according to the present invention can achieve the required functionality while eliminating a fuel injector and an exhaust control valve. Further complexity reduction and cost saving is achieved since there is similarly a reduction in wiring and plant manufacturing operations and complexity.

In another aspect of the present invention, the above disadvantages are overcome by a vehicle system comprising: a diesel fueled engine having an exhaust manifold through which exhaust gasses flow; an exhaust valve having at least first, second, third, and fourth unions, said valve directing exhaust gas from said first union to both said second and fourth unions and a second medium from said third union to said fourth union when in a first position, and directing said exhaust gas from said first union to both said second and fourth unions and said second medium from said third union to said second union when in a second position; an injector coupled to said third union that injects said second medium; a first emission control device coupled to said second union; and a second emission control device coupled to said fourth union.

In one particular example, a reductant, such as diesel fuel, or urea, can be used as the second medium.

Note that there are various types of valves that can be used to direct exhaust gas flow and reductant as claimed described above. For example, vacuum actuated or electromechanically actuated poppet valves can be used. Similarly, direct electronic solenoid valves can be used. Further still, hydraulically actuated valves, or any combination of the above, could be used. Note also that various types of emission control devices can be used. For example, catalyst comprising platinum on a carrier can be used. Further still, barium or other such elements can be added. Alternatively, zeolite type NOx catalysts could be used. Note also that there can be additional devices in between the fourth union and the second emission control device. Similarly, there can be additional devices in between the second union and the first emission control device. Also, there can be devices between the first union and the exhaust manifold of the engine (e.g., upstream catalyst, muffler, or particulate storage device). Finally, there can be addition devices, such as an air assist device between the third union and the reductant injector. Further still, other devices can be coupled to any of the at least four unions.

In another aspect of the present invention, disadvantages with prior approaches are overcome by a method for controlling an engine, the engine having an exhaust through which exhaust gasses flow, said exhaust having at least a first an second catalyst and at least a one reductant injector, the method comprising: providing a first portion of the exhaust gas flow to said first catalyst and a second portion of the exhaust gas flow to said second catalyst; operating in a first mode where said first portion is greater than said second portion; during at least a first interval while in said first mode, injecting reductant from said at least one reductant injector into said second portion of exhaust gas flow; operating in a second mode where the second portion is greater than said first portion; and during at least a second interval, while in said second mode, injecting reductant from said at least one reductant injector into said first portion of exhaust gasses.

In this way, it is possible to minimize the amount of necessary reductant used from the first reductant injector. Further, preferably, only a single reductant injector is needed.

Note that the first and second intervals can be of different lengths. Further note that the intervals can vary depending on operating conditions. For example, a time interval can be used. Alternatively, the interval can be ended based on estimates of $NO_x$ stored and reduced in the catalysts. Further, the interval can be set based on outputs of sensors coupled downstream of the catalysts.

BRIEF DESCRIPTION OF THE DRAWINGS

The present invention will be more fully understood by reading examples of embodiments in which the invention is used to advantage with reference to the drawings, wherein.

DETAILED DESCRIPTION OF THE INVENTION

Figure 1A:
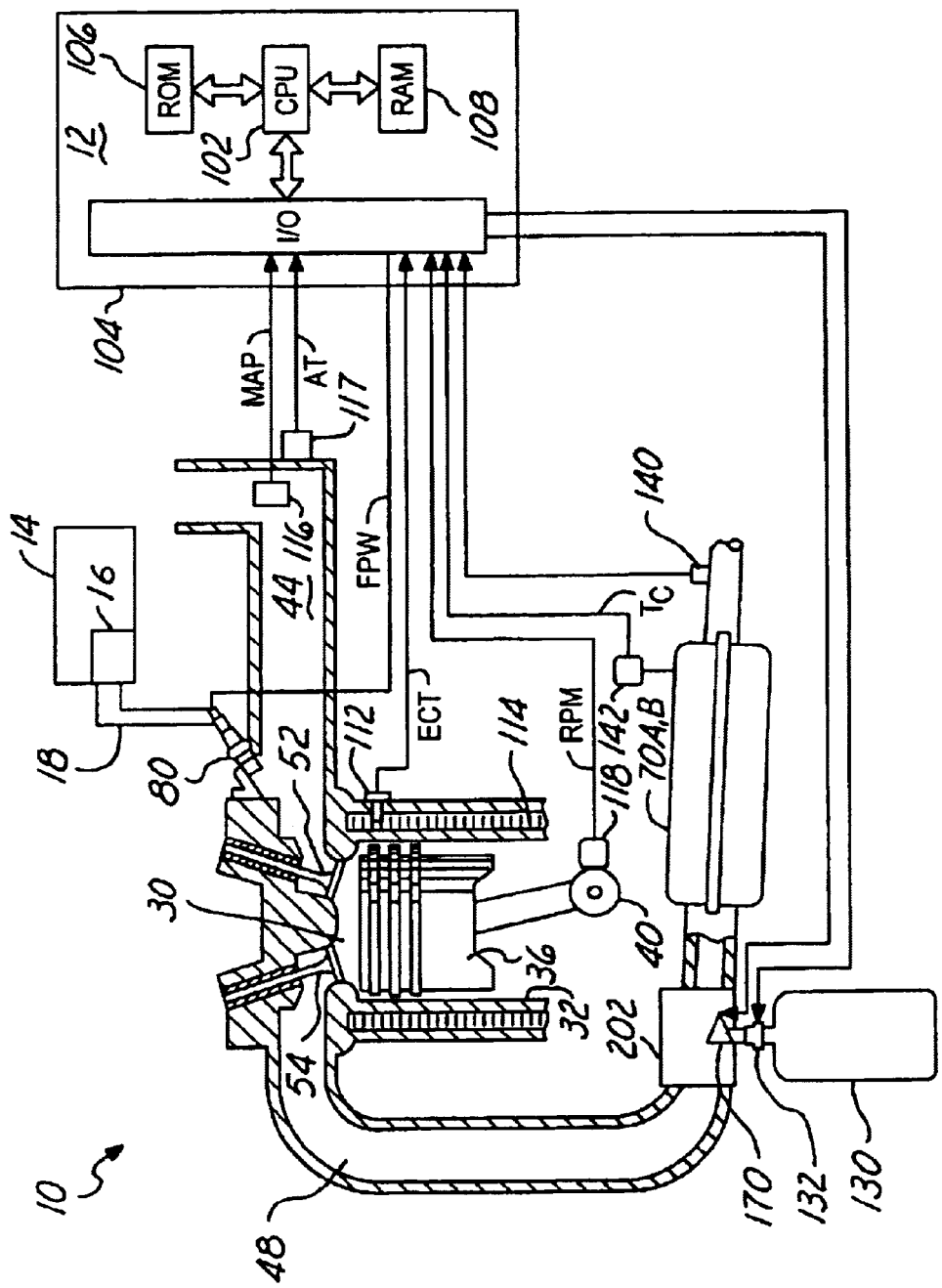
FIGS. 1A and 1B describe example engine systems.

Internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a diesel fuel system including a fuel tank 14, fuel pump 16, and fuel rail 18. Alternatively, the engine may be configured such that the fuel is injected directly into the cylinder of the engine, which is known to those skilled in the art as a direct injection engine.

Figure 1B:
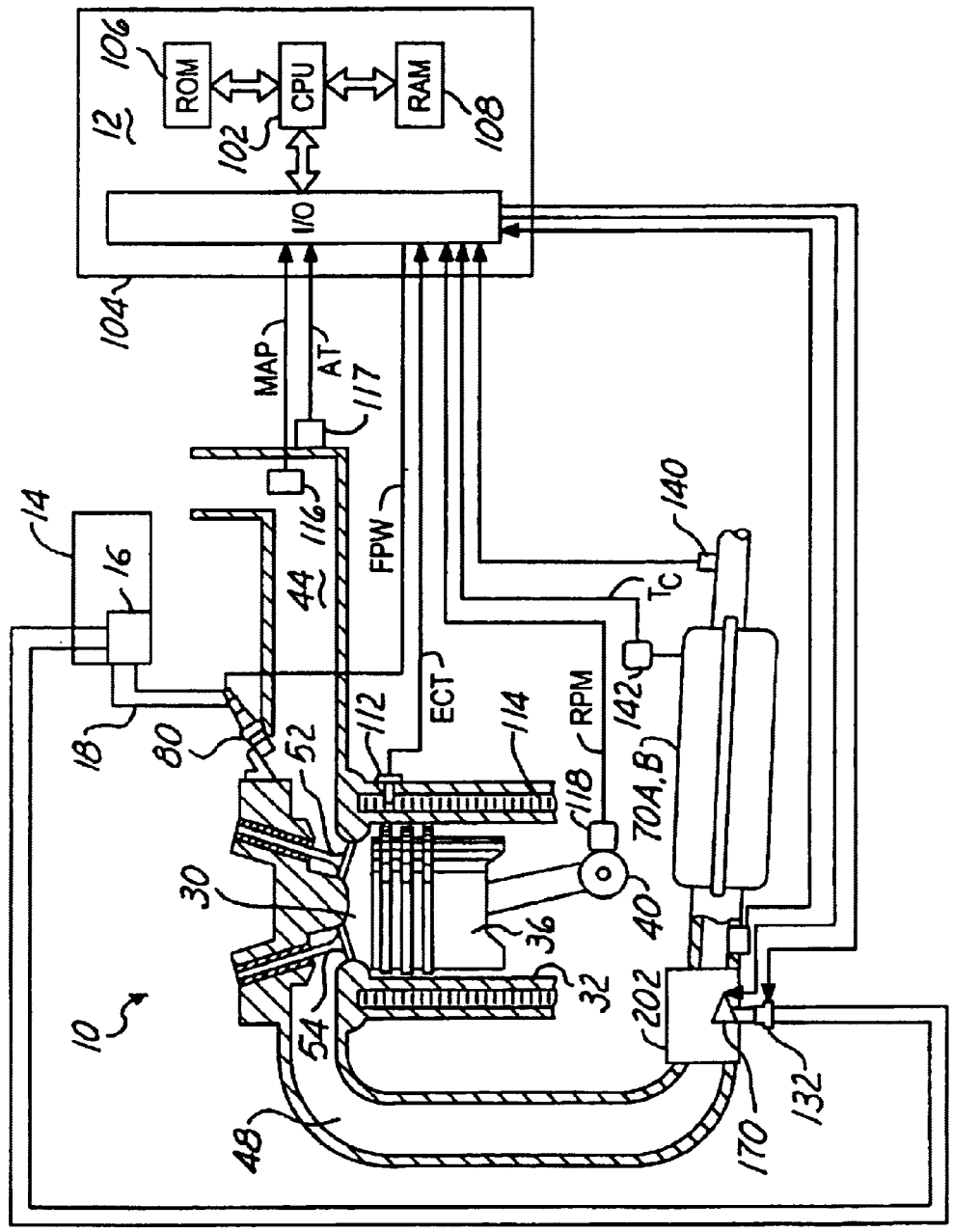

Reducing agent, for example, urea solution, or diesel fuel, is stored in storage vessel 130 coupled to exhaust manifold 48 upstream catalysts 70A and 70B (described more fully below herein). In an alternative embodiment, as shown in FIG. 1B, diesel fuel can be stored solely in the fuel tank and supplied to the exhaust system. Note that catalysts 70A and 70B are in separate exhaust paths as described in FIGS. 2A and 2B.

Reductant injector 170 controls the quantity of reducing agent delivered to the exhaust gases passing through valve 202 described more fully below. Pump 132 pressurizes the reducing agent supplied to control valve 134. Pump 132 and injector 170 are both controlled by controller 12. Ammonia sensor 140 is shown coupled to exhaust manifold 48 downstream of catalysts 70A and 70B. In an alternative embodiment, an optional ammonia sensor can be used either upstream or downstream of the catalysts. FIG. 1B shows an optional ammonia sensor 152 located upstream of catalysts 70A and B. Temperature sensor 142 coupled to catalyst 70A provides an indication of the temperature (T) of 70A. Alternatively, catalyst temperature (T) can be estimated.

Controller 12 is shown in FIG. 1A as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

In an alternative embodiment shown where engine 10 is a direct injection engine with injector 80 located to inject fuel directly into cylinder 30.

Figure 2A:
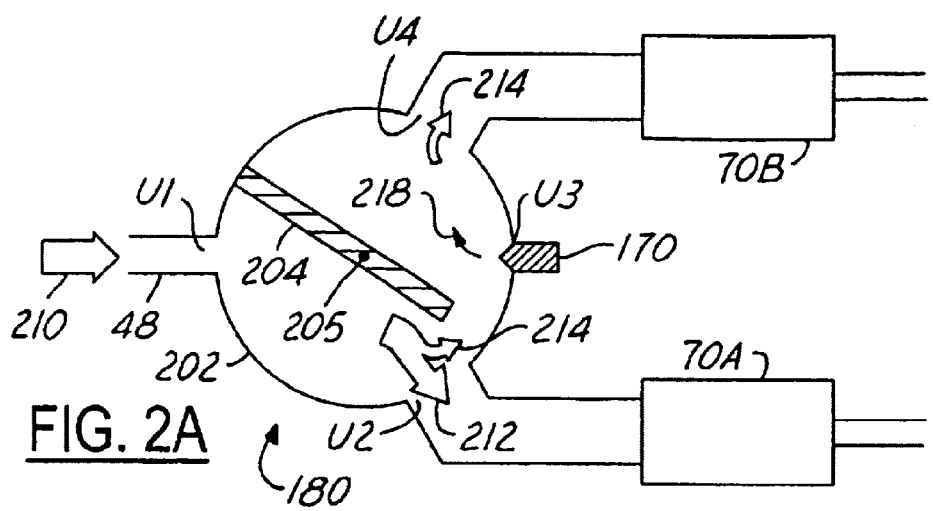
FIGS. 2A and 2B show an example valve according to the present invention.

Referring now to FIG. 2A, a more detailed view of exhaust three-way valve 180 and catalysts 70A and 70B is described where the valve is in the first position. Catalysts 70A and 70B are three-way catalysts known as $NO_x$ traps, that retain $NO_x$ when operating lean and reduce stored $NO_x$ when exhaust gas is rich or stoichiometric. Typically, $NO_x$ traps include barium as well as precious metals such as platinum. In particular, when in the first position, the exhaust flow 210 enters valve 180 through union U1. Housing 202 has four such unions: U1 through U4. Further as described above herein, a fuel injector 170 is coupled to the third union for injecting fuel into the housing 202. Further, pintle 204 (also referred to as a butterfly valve plate) is used to create the first and second valve positions.

Continuing with FIG. 2A, exhaust flow 210 is diverted to create a first and second exhaust flow amount 214 and 212, respectively. A majority of exhaust flow 210 (for example greater than 70%) is directed to the second union towards catalyst 70A. Also, a smaller portion of exhaust gas flow (for example less than 30%, and preferably between 2–10%) 214 leaks past pintle 204 and flows out the fourth union towards catalyst 70B. In addition, the injected fuel 218 is carried via the small leakage flow 214 to catalyst 70B.

In this way, the present invention can purge the catalyst 70B of stored $NO_x$ (and oxygen) using a relatively small amount of injected fuel, while the majority of exhaust $NO_x$ is stored in catalyst 70A.

Figure 2B:
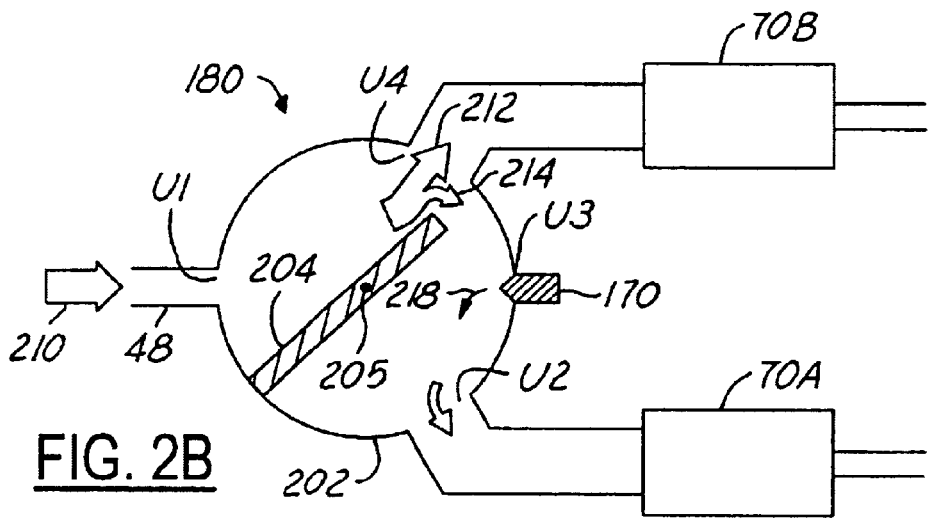

Referring now to FIG. 2B, valve 180 is shown in the second position. In this case, operation is similar to that described in FIG. 2A, except that the majority of exhaust gases 212 go to catalyst 70B, while a small amount of leakage flow 214 and injected fuel 218 flow through union 2 (U2) to catalyst 70A.

By periodically switching operation of exhaust valve 180 between the first and second positions, it is possible to minimize $NO_x$ emissions with a lower cost system.

Regarding FIGS. 2A and B, note that when valve 180 is in the first position, reductant from injector flows along a first path to catalyst 70B, whereas when in the second position, reductant flow along a second path to catalyst 70A. While portions of these two paths are the same, it is still possible for the reductant from a single injector to reach different catalysts depending on valve position. This is described more fully below with regard to FIG. 2C.

Figure 2C:
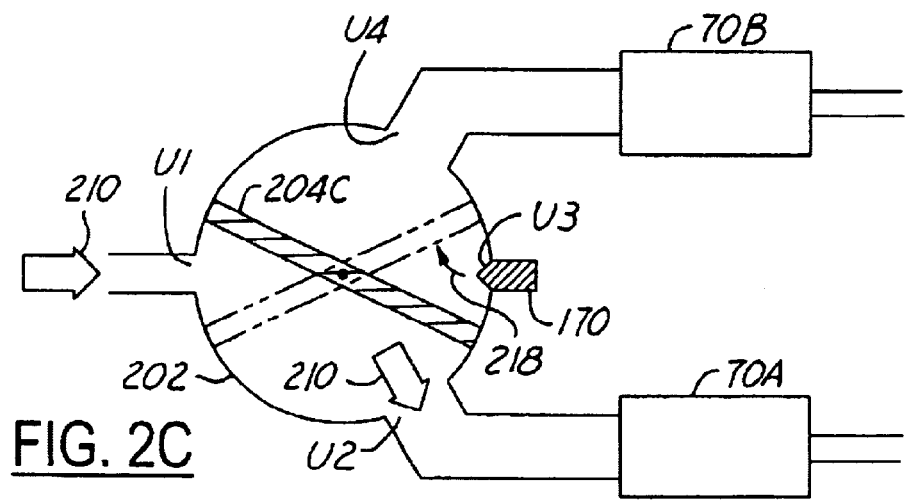
FIG. 2C shows an alternative embodiment valve according to the present invention.

Referring now to FIG. 2C, an alternative embodiment is shown where valve 202 has substantially no leakage flow. In this case, the valve is shown with alternate pintle 204c in the first position, where exhaust flow 210 passes through to catalyst 70A, and reductant flow 218 passes to catalyst 70B. In this case, the reductant injector 170 injects reductant under sufficient pressure so that it reaches catalyst 70B. Whether reductant is injected in liquid or vapor form, it is thus possible to purge the stored $NO_x$ from catalyst 70B. Compared with the embodiment of FIGS. 2A and 2B, the embodiment of FIG. 2C can require additional time to purge stored $NO_x$ since additional time may be needed for the hot exhaust system to vaporize any liquid reductant. Further, it may take more time for the reductant to reach catalyst 70B, and thereby purge stored $NO_x$, since there is substantially no exhaust gas to carry it along. However, the advantage is that there is virtually no oxygen to overcome, and thus less reductant is utilized to purge the stored $NO_x$.

The dashed line of FIG. 2C shows the valve in the second position, where operation is reversed from that described above. I.e., exhaust flow 210 flows to catalyst 70B, and reductant flow 218 flows to catalyst 70A. Also, as described above, this alternate embodiment can also be placed in a mid-way position between the first and second positions.

Figure 3:
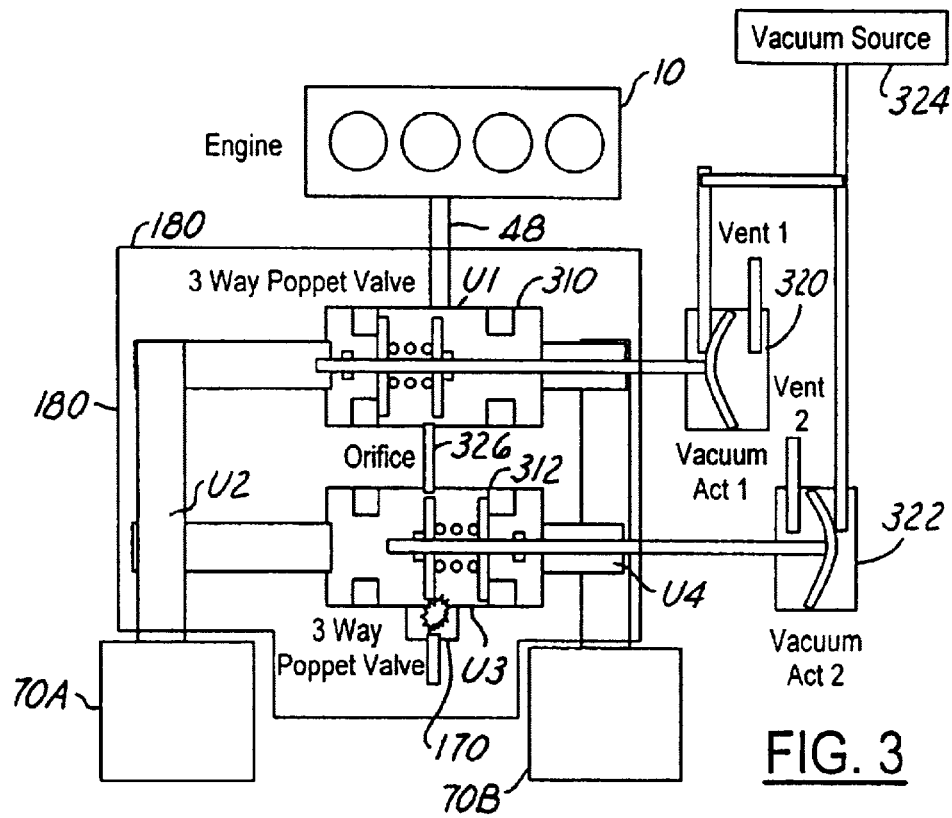
FIGS. 3 and 4 show additional alternative embodiment valves and valve systems according to the present invention.

Referring now to FIG. 3, a detailed schematic view of valve 180 is shown using one particular example of an embodiment. Note, however, that the generic operation described with regard to FIGS. 2A and 2B above herein, various types of three-way valves can be used, and various types of valve configurations can also be used. The particular example of FIG. 3 is simply one such system. Similarly, a second embodiment and exemplary valve system are described in FIG. 4.

Continuing now specifically with FIG. 3, an exhaust valve 180 is shown comprising two poppet valves 310 and 312, along with engine 10 and exhaust manifold 48. The specific position shown in FIG. 3 would correspond to the second position where a majority of exhaust flow exits from union 1 (U1) to union 4 (U4) and to catalyst 70B, and a smaller amount of exhaust flow, along with fuel injected from union 3 (U3) exits via union two (U2) to catalyst 70A. In this particular embodiment, first poppet valve 310 is controlled via vacuum actuator 320, and second poppet valve 312 is controlled via second vacuum actuator 320. Both vacuum actuators 320 and 322 are coupled to a vacuum source and controlled electronically via controller 12. Note that the valve 180 can be placed in the first position by reversing the vent and vacuum applied to the first and second vacuum actuators 320 and 322, respectively. Vacuum source 324 is shown coupled to the actuators 320 and 322. Further, orifice 326 is between valves 310 and 312.

Figure 4:
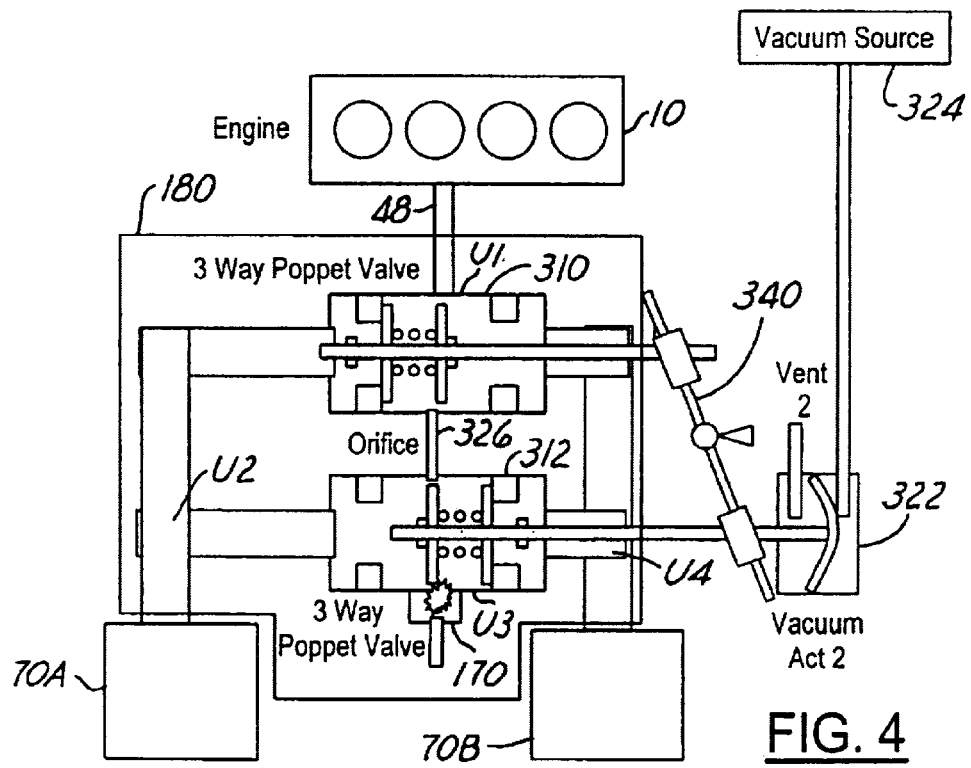

FIG. 4 uses essentially the same configuration as FIG. 3, however a pivot 340 is used so that only one vacuum actuator 322 is necessary. The pivot 340 is connected to both the first and second poppet valves 310 and 312 providing a dual action response to the single motion of actuator 322.

Figure 5A:
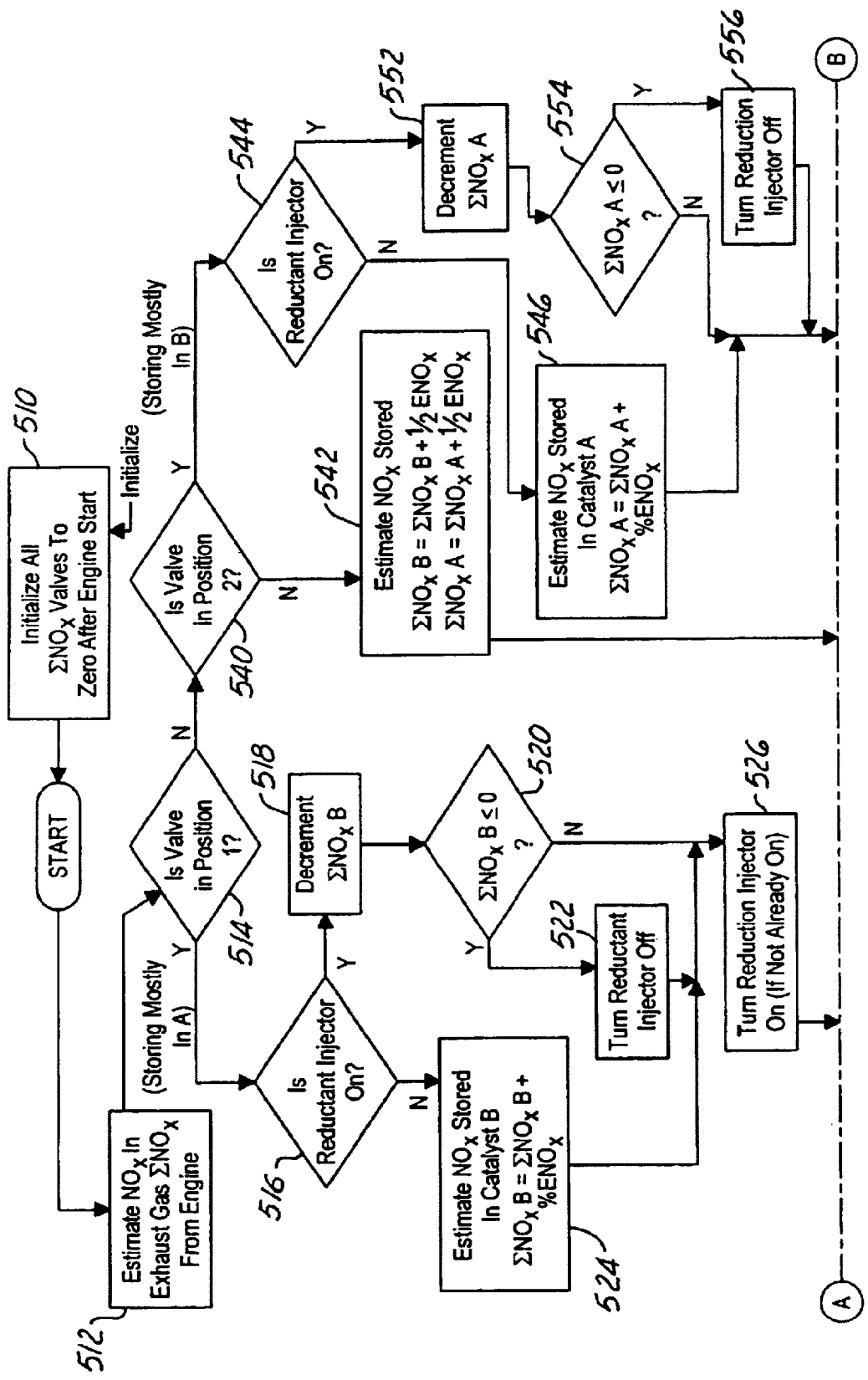
FIGS. 5A and 5B are flow charts of example operation.
Figure 5B:
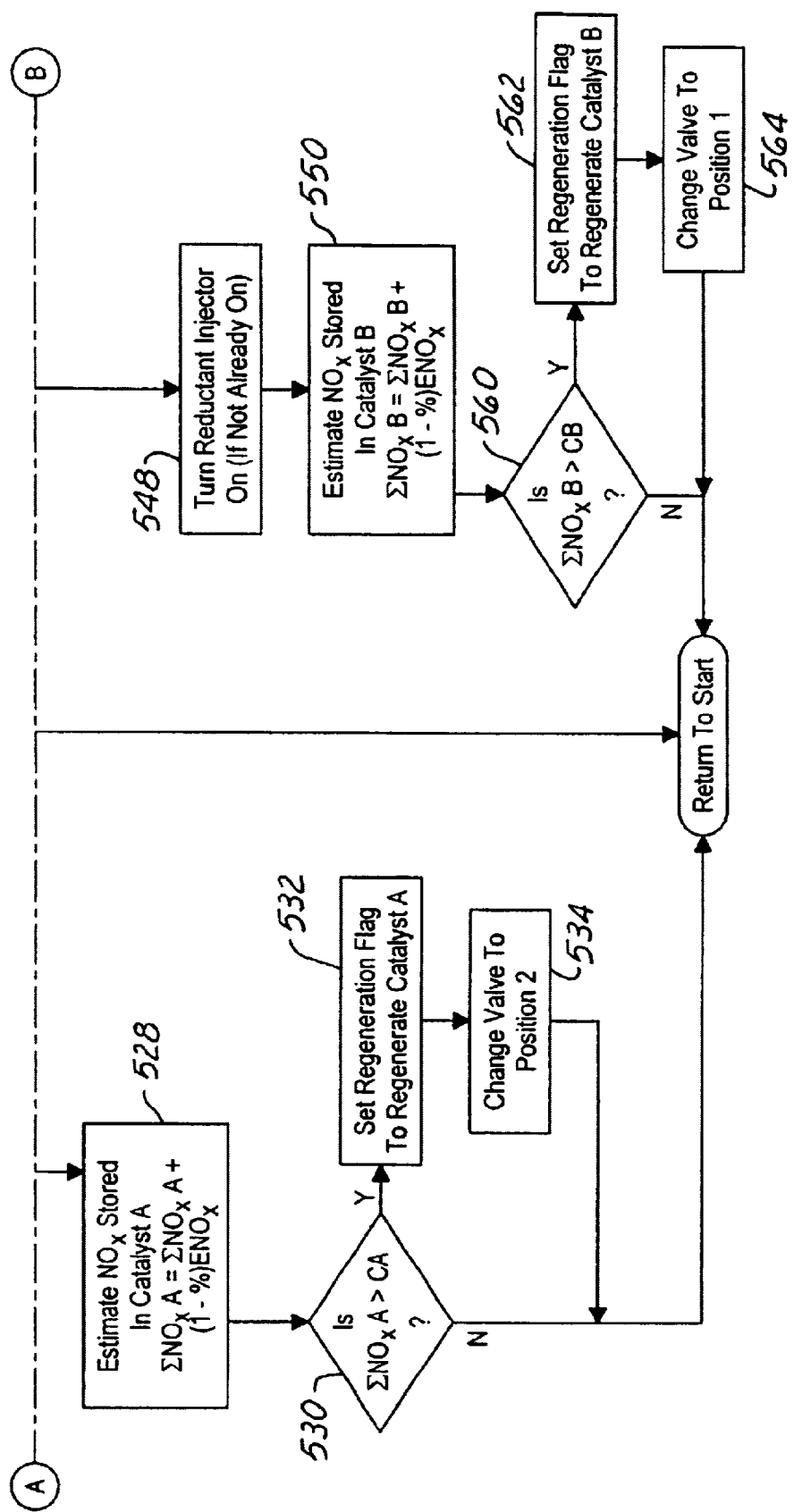

Referring now to FIG. 5, a method is described for controlling the regeneration of catalysts 70A, B. Note that controller 12 is programmed to execute the routine of FIG. 5, as well as various other routines. First, the routine initializes all estimates of stored $NO_x$ in each catalyst 70A and 70B to zero after an engine start in step 510. In an alternate embodiment, the $NO_x$ stored at engine shutdown can be stored in keep alive memory and then used as an initialization value of $NO_x$ stored upon engine start. Then, the routine passes the "start" position and estimates $NO_x$ in the exhaust gas, for example, based on $NO_x$ generated by the engine ($ENO_x$) in step 512. $ENO_x$ can be estimated, or measured. If estimated, it can be calculated based on various engine operating conditions such as, for example, engine speed, engine load, combustion temperature, air-fuel ratio, humidity, etc. Then, in step 514, a determination is made as to whether the valve 202 is in the first position. If the answer is YES, then this indicates that $NO_x$ is being primarily stored in catalyst 70A, and the routine continues to step 516. If the answer is NO, then this indicates that $NO_x$ is not being primarily stored in catalyst 70A, and the routine continues to step 540, described later herein.

Continuing with step 516, the routine determines whether the reductant (e.g., fuel) injector 170 is currently injecting fuel into the exhaust gas. If the answer to step 516 is YES, then the routine continues to step 518. A YES answer indicates that the $NO_x$ stored in Catalyst 70B is currently being released and reduced. As such, in step 518, the estimate of $NO_x$ stored in catalyst 70B ($\Sigma NO_x B$) is decremented. Next, in step 520, a determination is made as to whether the estimate has reached zero. Note that the amount of decrementing in step 518 can be based on the quantity of injected reductant into the catalyst, as well as catalyst temperature. In an alternative embodiment, rather than decrementing the estimate until it reaches zero, the routine can determine that most all of the stored $NO_x$ has been reduced based on a signal from a sensor located downstream of catalyst 70B. For example, an exhaust air-fuel ratio transition from lean to rich, or from stoichiometric to rich can provide such an indication.

Continuing with step 520, when the answer is YES (indicating that purging of stored $NO_x$ is no longer necessary), the injector 170 is turned off in step 522. Note also that the amount of reductant injected can be adjusted during the regeneration period based on the amount of $NO_x$ stored, time since the start of injection, etc. When the answer to step 520 is NO, the routine continues to step 526.

When the answer to step 516 is NO, the routine continues to step 524 to estimate the amount of $NO_x$ being stored in catalyst 70B. I.e., since some (leakage) exhaust gas is flowing to the catalyst, and the reductant is not being injected, the $NO_x$ contained in the exhaust gas will be stored. The estimate of $NO_x$ stored is based on a percentage (%) of the $NO_x$ generated by the engine. The percentage is the ratio of amount of exhaust gas flow going to each of catalyst 70A and 70B. For example, if 30% of the flow is going to catalyst 70B, then the % value is 30%.

Next, in step 526, the routine turns the reductant injector 170 on if it is not already on. Further, at this point, the routine can adjust (if equipped with an adjustable reductant injector) the quantity of injected reductant based on operation conditions as described above. Then, in step 528, the routine estimates the amount of $NO_x$ stored in catalyst 70A ($\Sigma NO_x A$) based on the generated $NO_x$ ($ENO_x$) and the flow percentage (%).

Next, in step 530, a determination is made as to whether the estimate of $NO_x$ stored in catalyst 70A is greater than a threshold for catalyst A (CA). Note, catalysts 70A and 70B can have different threshold. In particular, the catalysts may be of different size, different chemical composition, etc. Further, one may be a primary catalyst while the other is a secondary catalyst. This can allow additional cost savings since the secondary catalyst can be smaller, have less precious metals, etc. Further still, the catalysts can age at different rates. Also, the catalysts could be operating with different temperatures and thus have different storage capacities. Or, the compositions of the catalyst may be different because they experience different heat loads due to being located in different areas of the vehicle. According to the present invention, if catalysts 70A and 70B are designed so that CA is greater than CB, then by operating according to FIG. 5, exhaust gasses will primarily flow to Catalyst 70A for a longer duration (in one example a longer time period) in valve position 1 for a longer duration than they will flow to catalyst 70B in valve position 2. In this way, catalyst 70B can be a cheaper catalyst, yet the present invention can still reap the advantages of having two catalysts for efficient purging of a diesel engine.

Continuing with FIG. 5, when the answer to step 530 is YES, the routine continues to step 532 where the regeneration flag is set to regenerate catalyst 70A. I.e., the routine has determined that catalyst 70A should now be regenerated. As such, in step 534, the routine commands valve 170 to position 2. Then, the routine returns to the start position and repeats.

When the answer to step 514 is NO, the routine then determines in step 540 whether the valve is in position 2. If the answer to step 540 is NO, then the valve is in an intermediate position and exhaust gasses are being equally directed to both catalysts 70A and 70B. As such, in step 542 the $NO_x$ stored in catalysts 70A and B are calculated where the incoming NOx is equally divided (i.e., %=0.5, or 50%).

When the answer to step 540 is YES, a majority of the exhaust gas passes to catalyst 70B. Then, in step 544, a determination is made as to whether the reductant injector 544 is ON.

When the answer to step 544 is NO, the routine continues to step 546 to estimate the amount of $NO_x$ being stored in catalyst 70A. I.e., since some (leakage) exhaust gas is flowing to the catalyst, and the reductant is not being injected, the $NO_x$ contained in the exhaust gas will be stored. The estimate of $NO_x$ stored is based on a percentage (%) of the $NO_x$ generated by the engine. Next, in step 548, the routine turns the reductant injector 170 on if it is not already on. Further, at this point, the routine can adjust (if equipped with an adjustable reductant injector) the quantity of injected reductant based on operation conditions as described above. Then, in step 550, the routine estimates the amount of $NO_x$ stored in catalyst 70B ($\Sigma NO_x B$) based on the generated $NO_x$ ($ENO_x$) and the flow percentage (%)

If the answer to step 544 is YES, then the routine continues to step 552. A YES answer indicates that the $NO_x$ stored in Catalyst 70A is currently being released and reduced. As such, in step 552, the estimate of $NO_x$ stored in catalyst 70A ($\Sigma NO_x A$) is decremented. Next, in step 554, a determination is made as to whether the estimate has reached zero. Note that the amount of decrementing in step 552 can be based on the quantity of injected reductant into the catalyst as well as catalyst temperature. In an alternative embodiment, rather than decrementing the estimate until it reaches zero, the routine can determine that most all of the stored $NO_x$ has been reduced based on a signal from a sensor located downstream of catalyst 70A. For example, an exhaust air-fuel ratio transition from lean to rich, or from stoichiometric to rich can provide such an indication.

Continuing with step 554, when the answer is YES (indicating that purging of stored $NO_x$ is no longer necessary), the injector 170 is turned off in step 556. Note also that the amount of reductant injected can be adjusted during the regeneration period based on the amount of $NO_x$ stored, time since the start of injection, etc. When the answer to step 554 is NO, the routine continues to step 548.

Next, in step 560, a determination is made as to whether the estimate of $NO_x$ stored in catalyst 70B is greater than a threshold for catalyst B (CB). Note, as described above, catalysts 70A and 70B can have different thresholds.

Continuing with FIG. 5, when the answer to step 560 is YES, the routine continues to step 562 where the regeneration flag is set to regenerate catalyst 70B. I.e., the routine has determined that catalyst 70B should now be regenerated. As such, in step 564, the routine commands valve 170 to position 1. Then, the routine returns to the start position and repeats.

Note that since the exhaust flow from diesel engines may contain soot, there is a risk of the butterfly plate 204 sticking in one position. This can be circumvented by continuously jittering (or dithering) the plate around a nominal position. The jittering also helps in increasing the turbulence of the flow leaking to the rich branch, thereby improving mixing. The plate is typically actuated by a vacuum motor, since these tend to be lower cost and more durable in the face of high exhaust temperatures than electric actuators. However, electric or electromechanical actuators may also be used.

As described above, the valve 202 can be placed in an intermediate position. For example, During large flow conditions, as would occur in short transients, the butterfly plate can be moved to this middle position where lean exhaust flow flows to both branches and the injector is shut off. This decreases the space velocity to catalysts 70 A and B and improves $NO_x$ storage efficiency. It may be necessary to enrich the exhaust gas to both branches if this transient happens at a time where both LNTs are close to maximum capacities. Since these transients are of short duration, the fuel penalty incurred in this scenario is still less than that of a single branch configuration. Furthermore, during cold start, the catalysts may still be too cold to be purged, and the valve 202 could also be put in the intermediate position to exploit the higher storage capacity of the system thus created. In other words, when the individual catalyst storage capacities of catalysts 70A and B is low (e.g., due to low temperature), then the two can be used at the same time to store $NO_x$, thus creating effectively an enlarged system storage capacity.

Figure 6:
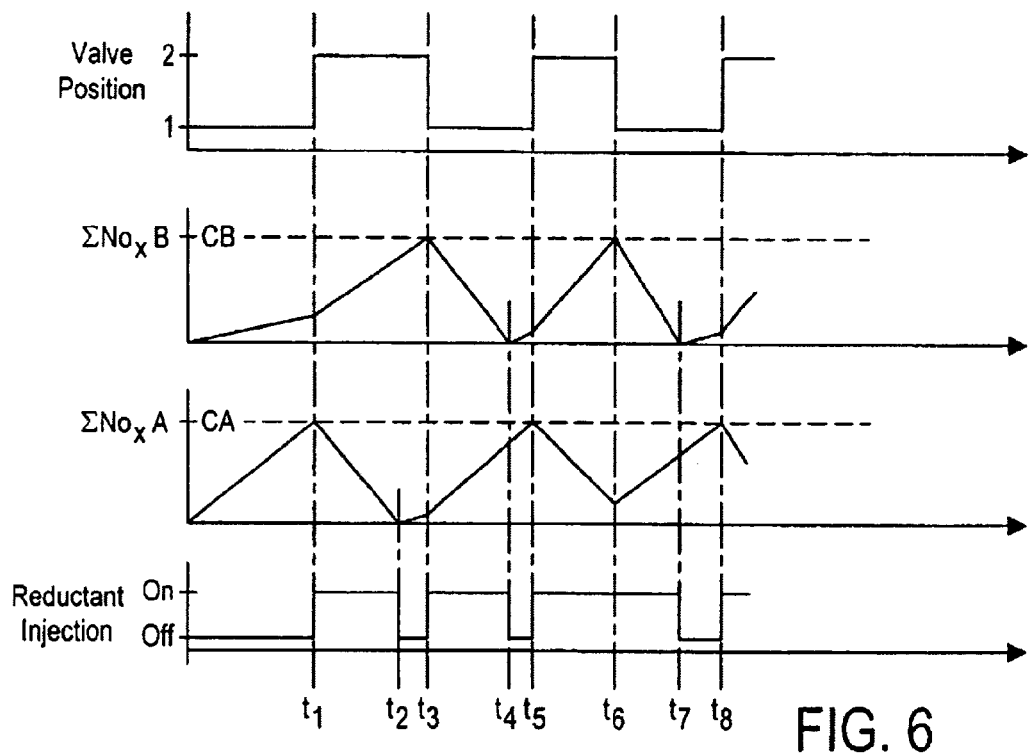
FIG. 6 shows graphs illustrating operation according to the present invention.

Referring now to FIG. 6, four graphs show operation according to the present invention. From time t0 to t1, the reductant injector is off and both catalysts start with no $NO_x$ storage (e.g., after a cold engine start). The valve is in position 1, and as such, catalyst 70A is receiving (and storing) more $NO_x$ than catalyst 70B. At time t1, catalyst 70A reaches threshold CA and the valve is moved to position 2 and the injector is turned on. As such, the $NO_x$ stored in catalyst 70A is gradually reduced until time t2, when all of the stored $NO_x$ has been reduced and the injector is turned off. Note that from time t1 to t2, $NO_x$ is continually being stored in catalyst 70B. At time t2, catalyst 70B reaches capacity CB, and the valve is moved to position 1 and the injector is turned on. Again, at time t4, the $NO_x$ stored in catalyst 70B is reduced and the injector can be turned off. Then, at time t5, catalyst 70A reaches capacity and the system again turns the injector on and moves the valve to position 2. From t5 to t6, the $NO_x$ in catalyst 70A is being reduced. However, before all of the $NO_x$ in catalyst 70A is reduced, catalyst 70B reaches the threshold CB. As such, the valve is switched to position 1 at time t6. Then, at t7, the injector is turned off as the $NO_x$ in catalyst 70B is reduced. Then, at t8, again, the valve position is switched and the injector turned on.

In this way, the exhaust system can continually prevent most engine generated $NO_x$ from exiting the tailpipe, while wasting only a minimal amount of fuel to overcome excess oxygen in the exhaust.

Figure 7A:
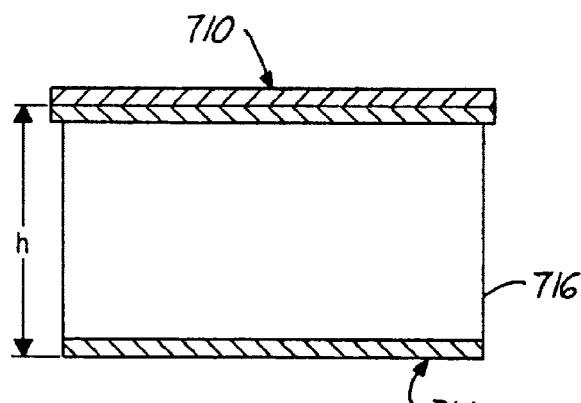
FIGS. 7–9 show exemplary details of a valve according to the present invention.

Referring now to FIG. 7A, additional details of parts for three-way valve 180 are described. The top part of FIG. 7A shows the three-way valve exterior parts from a side view. The stainless steel removable cover 710 is shown coupled to a ¼ inch stainless steel ring 712. This ¼ inch stainless steel ring 712 is coupled to a ⅛-inch thick stainless steel tube 716, which has a six-inch diameter. The height of the tube is preferable five inches. The bottom plate 714 is also a ¼ inch stainless steel cover coupled to tube 716. Preferably, bottom cover 714 is welded to tube 716. As described below, the removable cover 710 is coupled the ring 712 via several bolts as described in the bottom of FIG. 7. Also, the stainless steel rings 712 are coupled to tube 716 via a weld joint.

Figure 7B:
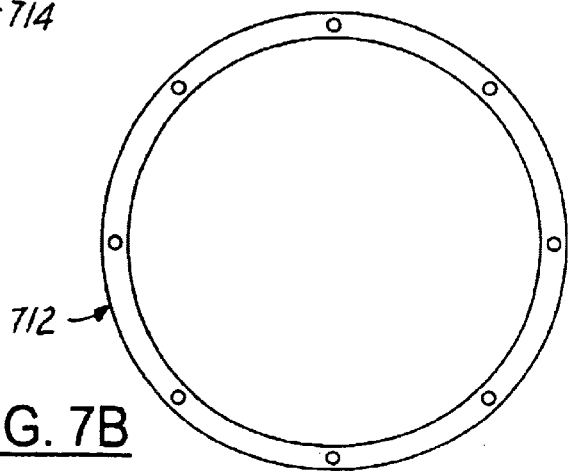

The bottom graph of FIG. 7B describes the top view of three-way valve parts. In this example, ring 712 is ½ inch wide and a ¼ inch thick. As described above, this ring is welded to the six-inch diameter tube 716. Further, this bottom graph shows the eight holes evenly spaced around ring 712. These holes are bolt holes that are preferably ¼–20.

Figure 8:
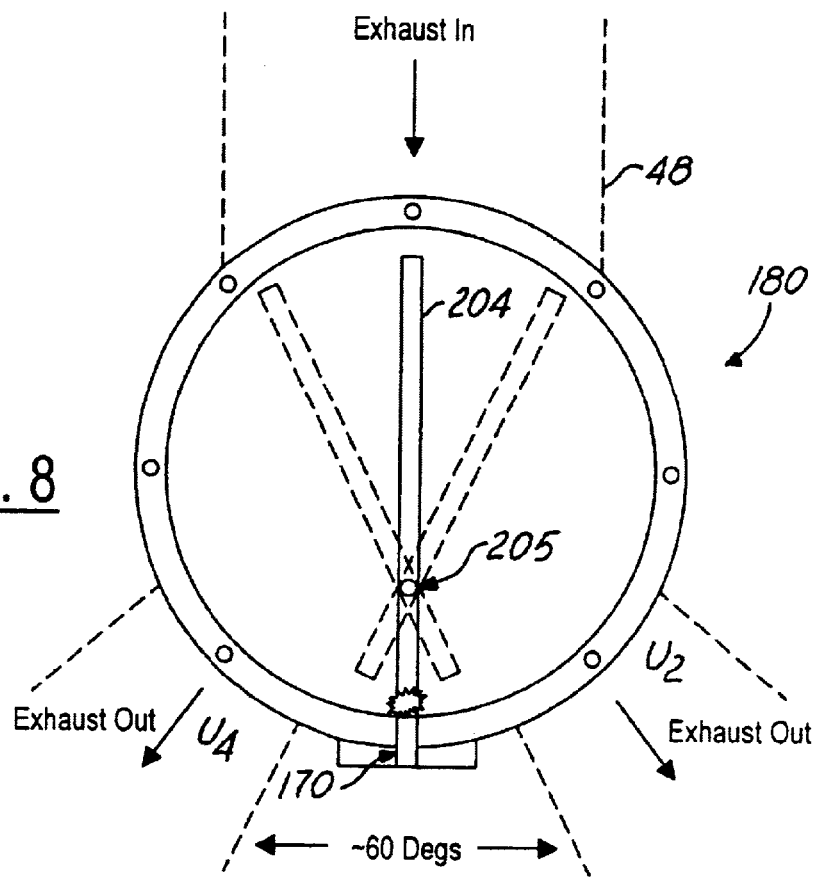

Referring now to FIG. 8, a more detailed view three-way valve 180 is shown. In this case, the exhaust flow enters valve 180 via a four-inch diameter exhaust pipe, which is welded to the three-way exhaust valve 180. In this particular example, the flap 204 is made of stainless steel and is approximately, 4.5 inches by 4.5 inches by 3/16 of an inch. This flap 204 pivots about pivot point 205. Further, in this case, injector 170 is a heated air-assist injector. The pivot is positioned in this case so that flap 204 rotates to form approximately a 60-degree angle between the two exhaust outlets U2 and U4. These outlets are approximately three inches in diameter and welded to three-way valve 180.

Figure 9:
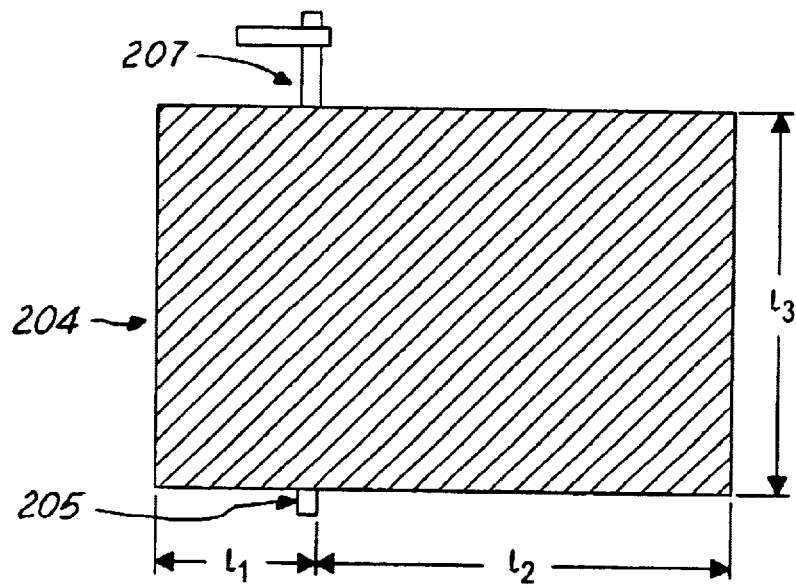

Referring now to FIG. 9, a detailed view of the flap valve 204 is shown. In this case, flap valve 204 is shown with the pivot 205 and a pivot arm 207 which is used to rotate flap 204 about the pivot point 205. In a preferred embodiment, pivot arm 207 is coupled to either a vacuum actuator or an electric motor. The pivot arm is coupled to flap valve 204 at a position of L1. In a preferred embodiment, L1 is 1.5 inches and L2 is three inches. Further, in a preferred embodiment, the height of flap valve L3 is 4.5 inches.

We claim:

1. A method for controlling an emission system, the system having an engine and an exhaust through which exhaust gasses flow, said exhaust having at least a first and second catalyst arranged in parallel adapted for reducing NOx emissions with incoming reductants, and said exhaust also having at least one reductant delivery device, said reductant delivery device located downstream of the engine, the method comprising:

when requested based on a first operating condition, diverting at least a portion of exhaust gas flow from said second catalyst to a first path to said first catalyst and providing reductant from the reductant delivery device into a second path to said second catalyst in the exhaust system that reaches said second catalyst to reduce NOx in said second catalyst; and when requested based on a second operating condition, diverting at least a portion of exhaust gas flow from said first catalyst to said second path and providing reductant from the reductant delivery device into said first path in the exhaust system that reaches said first catalyst to reduce NOx in said first catalyst, wherein the reductant delivery device is in the engine exhaust.

2. The method of claim 1 wherein all of the exhaust gas flow is diverted from the second catalyst when requested based on said first operating condition.

3. The method of claim 1 wherein all of the exhaust gas flow is diverted from the first catalyst when requested based on said second operating condition.

4. The method of claim 1 wherein said reductant delivery device is a diesel fuel injector.

5. The method of claim 1 wherein said reductant delivery device is a fuel injector.

6. The method of claim 1 wherein said first catalyst and said second catalyst have a differing physical characteristic.

7. The method of claim 1 wherein said first condition is a condition of said second catalyst.

8. The method of claim 7 wherein said first condition is an amount of NOx stored in said second catalyst.

9. The method of claim 1 wherein said second condition is a condition of said first catalyst.

10. The method of claim 9 wherein said second condition is an amount of NOx stored in said first catalyst.

11. A method for controlling an emission system, the system having an engine and an exhaust through which exhaust gasses flow, said exhaust having at least a first and second catalyst arranged in parallel adapted for reducing NOx emissions with incoming reductants, and said exhaust also having at least one reductant delivery device, said reductant delivery device located downstream of the engine, the method comprising:

when requested based on a first operating condition, operating in a first mode where exhaust gasses flow to said first catalyst at least partially along a first path, and during at least a first interval while in said first mode, providing reductant from the reductant delivery device into the exhaust system at least partially along a second path that reaches said second catalyst to reduce NOx in said second catalyst; and when requested based on a second operating condition, operating in a second mode where exhaust gasses flow to said second catalyst at least partially along said second path, and during at least a second interval while in said second mode, providing reductant from the reductant delivery device into the exhaust system at least partially along said first path that reaches said first catalyst to reduce NOx in said first catalyst, wherein the reductant delivery device is in the engine exhaust.

12. The method of claim 11, wherein said first condition is a condition of said second catalyst.

13. The method of claim 12, wherein said first condition is an amount of NOx stored in said second catalyst.

14. The method of claim 11 wherein said second condition is a condition of said first catalyst.

15. The method of claim 14 wherein said second condition is an amount of NOx stored in said first catalyst.

16. The method of claim 11 wherein said reductant delivery device is coupled to a valve in the engine exhaust.

17. The method of claim 16 wherein said reductant delivery device is a diesel fuel injector.

18. A method for controlling an emission system, the system having an engine and an exhaust through which exhaust gasses flow, said exhaust having at least a first and second catalyst arranged in parallel adapted for reducing NOx emissions with incoming reductants, and said exhaust also having at least one reductant delivery device, said reductant delivery device located downstream of the engine, the method comprising:

operating in a first mode where exhaust gasses flow to said first catalyst, and during at least a first interval while in said first mode, providing reductant from the reductant delivery device into the exhaust system that reaches said second catalyst to reduce NOx in said second catalyst; and operating in a second mode where exhaust gasses flow to said second catalyst, and during at least a second interval while in said second mode, providing reductant from the reductant delivery device into the exhaust system that reaches said first catalyst to reduce NOx in said first catalyst, wherein the reductant delivery device is in the engine exhaust, and said first catalyst and said second catalyst have a differing capacity.

19. The method of claim 18, wherein said engine is a diesel engine.

20. A method for controlling an emission system, the system having an engine and an exhaust through which exhaust gasses flow, said exhaust having at least a first and second catalyst arranged in parallel adapted for reducing NOx emissions with incoming reductants, and said exhaust also having at least one reductant delivery device, said reductant delivery device located downstream of the engine, the method comprising:

when requested based on a first operating condition, diverting at least a portion of exhaust gas flow from said second catalyst and providing reductant from the reductant delivery device into the exhaust system that reaches said second catalyst to reduce NOx in said second catalyst; and when requested based on a second operating condition, diverting at least a portion of exhaust gas flow from said first catalyst and providing reductant from the reductant delivery device into the exhaust system that reaches said first catalyst to reduce NOx in said first catalyst, wherein the reductant delivery device is in the engine exhaust, wherein said reductant delivery device is coupled to an exhaust valve located in the exhaust that performs said diversion.

21. The method of claim 20 wherein said reductant delivery device is a fuel injector.

22. The method of claim 20 wherein said reductant delivery device is a diesel fuel injector.

* * * * *